(12) United States Patent
Chang et al.

(10) Patent No.: US 10,937,120 B2
(45) Date of Patent: Mar. 2, 2021

(54) VIDEO PROCESSING SYSTEM AND PROCESSING CHIP

(71) Applicant: Realtek Semiconductor Corporation, Hsinchu (TW)

(72) Inventors: Yi-Shu Chang, Hsinchu County (TW); Cheng-Hsin Chang, Hsinchu (TW); Hsu-Jung Tung, Zhubei (TW); Chun-Hsing Hsieh, Hsinchu (TW); Sen-Huang Tang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/804,121

(22) Filed: Feb. 28, 2020

(65) Prior Publication Data
US 2020/0202483 A1 Jun. 25, 2020

Related U.S. Application Data

(63) Continuation of application No. 16/140,636, filed on Sep. 25, 2018, now Pat. No. 10,643,298.

(Continued)

(51) Int. Cl.
G06T 1/20 (2006.01)
G06T 15/00 (2011.01)
G06T 3/40 (2006.01)
H04N 7/01 (2006.01)
G06T 15/50 (2011.01)
G09G 3/20 (2006.01)
G09G 5/36 (2006.01)
G09G 5/14 (2006.01)

(52) U.S. Cl.
CPC .............. *G06T 1/20* (2013.01); *G06T 3/4053* (2013.01); *G06T 15/005* (2013.01); *G06T 15/503* (2013.01); *G09G 3/2096* (2013.01); *G09G 5/363* (2013.01); *H04N 7/0125* (2013.01); *G09G 5/14* (2013.01); *G09G 2340/02* (2013.01); *G09G 2340/0407* (2013.01)

(58) Field of Classification Search
None
See application file for complete search history.

(56) References Cited

U.S. PATENT DOCUMENTS 9,131,098 B2 * 9/2015 Jang ...................... G11B 27/105
2007/0019111 A1 * 1/2007 Won .................... H04N 21/4316
348/569

(Continued)

FOREIGN PATENT DOCUMENTS

JP S61193580 A 8/1986
JP H10191379 A 7/1998

(Continued)

*Primary Examiner* — Nurun N Flora
(74) *Attorney, Agent, or Firm* — Locke Lord LLP; Tim Tingkang Xia, Esq.

(57) ABSTRACT

A video processing system includes a main chip and a processing chip. The main chip receives first data. The processing chip is coupled to the main chip, and receives second data and to perform a video processing on at least one of the first data transmitted from the main chip and the second data, in order to drive a display panel. First video carried on the first data or second video on the second data has a first resolution, and the first resolution is at least 8K ultra high definition.

16 Claims, 4 Drawing Sheets

Related U.S. Application Data

(60) Provisional application No. 62/630,258, filed on Feb. 14, 2018.

(56) References Cited

U.S. PATENT DOCUMENTS

| | | | |
|---|---|---|---|
| 2012/0274808 A1 | 11/2012 | Chong et al. | |
| 2015/0101002 A1* | 4/2015 | Yamashita | H04N 21/23895 725/116 |
| 2016/0219309 A1* | 7/2016 | Lida | H04N 19/42 |
| 2017/0208334 A1* | 7/2017 | Yoo | H04N 19/156 |
| 2018/0184173 A1* | 6/2018 | Tsukagoshi | H04N 21/435 |
| 2018/0220189 A1* | 8/2018 | Hodge | G06F 16/787 |

FOREIGN PATENT DOCUMENTS

| | | |
|---|---|---|
| JP | 2010081592 A | 4/2010 |
| JP | 2016184775 A | 10/2016 |
| JP | 2017003756 A | 1/2017 |
| TW | 200936412 A | 9/2009 |
| TW | 201238360 A | 9/2012 |

* cited by examiner

VIDEO PROCESSING SYSTEM AND PROCESSING CHIP

RELATED APPLICATIONS

This is a continuation of U.S. application Ser. No. 16/140,636, filed Sep. 25, 2018, which application claims priority to U.S. Provisional Application Ser. No. 62/630,258, filed Feb. 14, 2018, the entire contents of which are hereby incorporated herein by reference in their entireties.

BACKGROUND

Technical Field

The present disclosure relates to a video processing system. More particularly, the present disclosure relates to a video processing system for processing video having a maximum resolution of at least 8K ultra high definition.

Description of Related Art

In order to pursue higher video quality, the resolution of video data has been rapidly increased. However, a higher resolution of video data indicates higher requirements of processing the video data, such as higher data rate, higher data throughput, etc. As a result, some existing chips are unable to process the video data having a maximum resolution of standard.

DETAILED DESCRIPTION

Figure 1A:
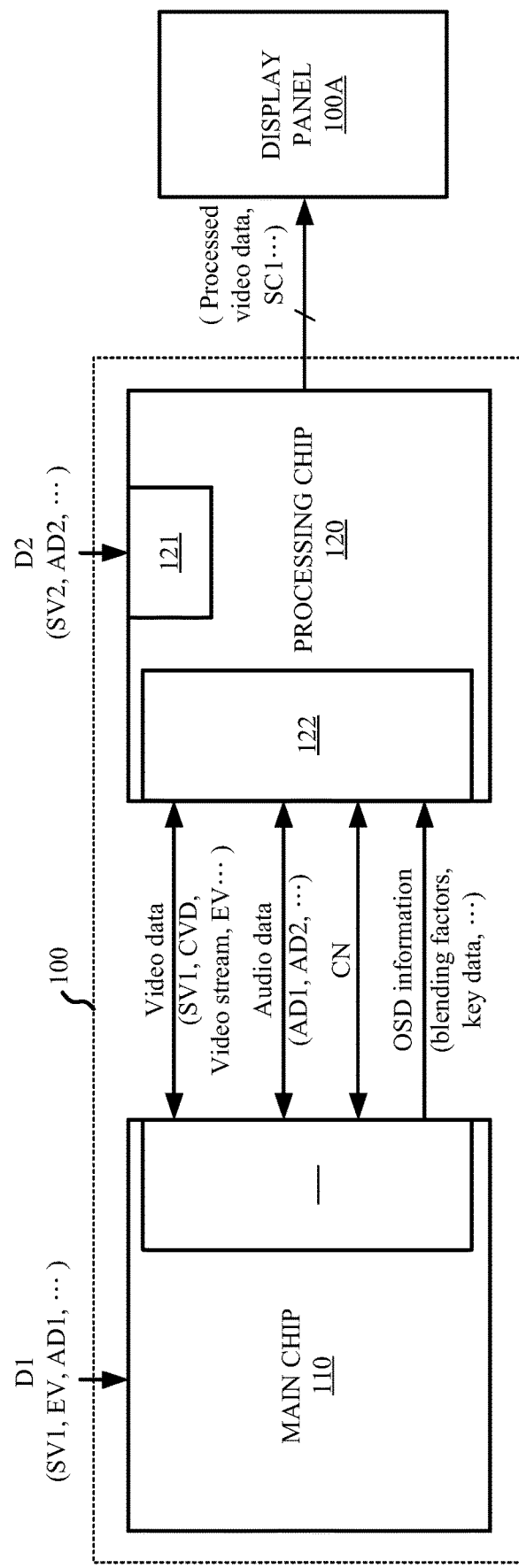
FIG. 1A is a schematic diagram of a video processing system according to some embodiments of the present disclosure.

FIG. 1A is a schematic diagram of a video processing system 100 according to some embodiments of the present disclosure. In some embodiments, the video processing system 100 is employed to process videos having a resolution range, in which the maximum of the resolution range is at least 8K ultra high definition (UHD).

As shown in FIG. 1A, a display panel 100A is coupled to the video processing system 100, in order to display video from data processed by the video processing system 100. In some embodiments, the video processing system 100 transmits processed video data and one or more control signals SC1 to at least one controller of the display panel 100A, in order to drive the display panel 100A. In some embodiments, the at least one controller of the display panel 100A includes a timing controller, a source driver, a gate driver, etc. In some embodiments, the display panel 100A has 8K UHD or higher resolution.

In some embodiments, the video processing system 100 includes a main chip 110 and a processing chip 120. In some embodiments, the main chip 110 includes a transmission interface 111, and the processing chip 120 includes a transmission interface 122. In some embodiments, the main chip 110 and the processing chip 120 are configured to transmit various information (e.g., video data, control signals, on-screen display (OSD) information, audio data etc.) to each other via the transmission interfaces 111 and 122.

In some embodiments, the main chip 110 performs video processing and/or audio processing based on data D1, in order to drive the display panel 100A to show graphic(s) and/or video(s) carried on the data D1. In some embodiments, a video SV1 carried on the data D1 has a first predetermined resolution. In some embodiments, the first predetermined resolution is lower than 8K UHD.

In some embodiments, an encoded video stream EV may be carried on the data D1. In some embodiments, the encoded video stream EV has a resolution more than 4K definition (e.g., 8K). In some embodiments, the main chip 110 may be unable to process this encoded video stream EV. Under this condition, the main chip 110 may transmit the encoded video stream EV to the processing chip 120 through the transmission interfaces 111 and 122, such that the encoded video stream EV can be processed in the processing chip 120. In some embodiments, the encoded video stream EV may be received from Internet or broadcast through wireless transmission.

In some embodiments, the transmission interfaces 111 and 122 may be implemented with at least one protocol, which includes universal serial bus (USB), Inter-Integrated Circuit ($I^2C$), etc. In some embodiments, the transmission interfaces 111 and 122 may be configured to transmit/receive uncompressed video data. For example, uncompressed video data associated with the data D1 may be transmitted to the processing chip 120 via the transmission interface 111. In some embodiments where the uncompressed video data are transmitted, the transmission interfaces 111 and 122 may be implemented with V-by-one, HDMI, etc. The types of the at least one protocol for implementing the transmission interfaces 111 and 122 are given for illustrative purposes, and the present disclosure is not limited thereto.

In some embodiments, the main chip 110 provides one or more input interfaces (not shown) for connecting with one or more external audio/video (A/V) sources to receive the data D1. In some embodiments, the one or more input interfaces may include digital visual interface (DVI), high definition multimedia interface (HDMI), display port, USB, Broadcast, network, etc. In some embodiments, the main chip 110 may provide wireless transmission interfaces (not shown), such as Wi-Fi, mobile network interfaces, etc. The types of the interfaces provided by the main chip 110 are given for illustrative purposes, and the present disclosure is not limited thereto.

In some embodiments, the processing chip 120 performs video processing and/or audio processing based on data D2. In some embodiments, a video SV2 carried on the data D2 has a second predetermined resolution. In some embodiments, a maximum of the second predetermined resolution is higher than the first predetermined resolution. In some embodiments, the maximum of the second predetermined resolution is higher than 4K. In some embodiments, the maximum of the second predetermined resolution may be 8K UHD or any successor of 8K definition in standard. In some embodiments, the main chip 110 may be implemented with an existing TV chip. Accordingly, with the cooperation of the processing chip 120, the ability for processing videos with higher resolution can be achieved.

In some embodiments, the processing chip 120 may perform video processing based on video data associated with the data D1 transmitted from the main chip 110. In other words, the processing chip 120 has a compatibility with processing video data having the first predetermined resolution and/or the second predetermined resolution. Alternatively stated, the resolution range of video data able to be processed by the processing chip 120 is a superset of the resolution range of video data able to be processed by the main chip 110. For example, the resolution of video (e.g., video SV2) processed by the processing chip 120 may be any resolution lower than or equal to the maximum of the second predetermined resolution (e.g., 8K UHD), such as 480P, 720P, 1080P, 2K, 4K, and/or 8K UHD. The resolution of video (e.g., video SV1) processed by the main chip 110 may be any resolution lower than or equal to the maximum of the first predetermined resolution (e.g., 4K), such as 480P, 720P, 1080P, 2K, and/or 4K.

In some embodiments, the processing chip 120 transforms video data (e.g., video SV1 or SV2) having an initial resolution lower than the maximum of the second predetermined resolution into video data having a resolution that is higher than the initial resolution and is lower than or equal to the maximum of the second predetermined resolution. In some embodiments, the processing chip 120 may increase a frame rate of video data, in order to meet requirements of the display panel 100A. In some embodiments, the video processing performed by the main chip 110 or by the processing chip 120 may include a video encoding/decoding operation, a de-interlacing operation, a scaling operation, an analog-to-digital conversion, a digital-to-analog conversion, and/or OSD graphic rendering/mixing/blending operation(s).

In some embodiments, the processing chip 120 includes an input interface 121 for connecting with an external video source to receive the data D2. In some embodiments, the interface 121 has ability sufficient to support video format having the second predetermined resolution. For example, the input interface 121 supports an original 8K video source input.

In some embodiments, types of the input interface 121 include display port, video stream, HDMI, and/or any later interface sufficient to transmit video data having a resolution higher than or equal to the second predetermined resolution. The types of the at least one input interface 121 are given for illustrative purposes, and the present disclosure is not limited thereto.

In some embodiments, the main chip 110 may transmit compression video data CVD (e.g., carried by the data D1, or compression result of data D1 or video stream) and information of numbers of frame flags (which may be carried on the control signals CN) associated with the compression video data CVD to the processing chip 120 via the transmission interface 111. Accordingly, the processing chip 120 may perform the video processing based on the compression video data CVD and the numbers of frame flags, in order to generate NV-sync video data to drive the panel 130. In some embodiments, before being transmitted to the processing chip 120, images/video carried on the compression video data CVD are overlapped with OSD images. In some embodiments, the compression video data CVD has a resolution lower than or equal to the second predetermined resolution.

In some embodiments, the main chip 110 generates the compression video data CVD based on the data D1. In some embodiments, the video SV1 carried on data D1 may have a resolution equal to the maximum of the second predetermined resolution. Under this condition, in order to process the video SV1, the main chip 110 compresses video data associated with the data D1 to generate the compression video data CVD, in which the video data associated with the data D1 corresponds to the video SV1. As a result, the processing chip 120 is able to perform video processing on the compression video data CVD, in order to drive the display panel 100A. In various embodiments, each of the main chip 110 and the processing chip 120 is able to process audio data. In some embodiments, speakers (not shown) are arranged to be driven by the main chip 110, and the processing chip 120 transmits audio data AD2 carried on the data D2 to the main chip 110 via the transmission interface 122. Accordingly, the main chip 110 performs the audio processing based on the audio data AD2, in order to output sound via the speakers. In some embodiments, speakers (not shown) are arranged to be driven by the processing chip 120, and the main chip 110 transmits audio data AD1 carried on the data D1 to the processing chip 120 via the transmission interface 111, in order to output sound via the speakers.

In some embodiments, the audio data AD1 or AD2 is audio pulse code modulated data. In some embodiments, the audio data AD1 or AD2 is audio compression data. The data formats of the audio data AD1 and AD2 are given for illustrative purposes, and the present disclosure is not limited thereto.

In various embodiments, the main chip 110 and the processing chip 120 are configured to transfer various control signals CN to each other via the transmission interfaces 111 and 122, in order to perform video/audio processing. In some embodiments, the control signals CN include information of timing of the video stream (e.g., compression video data CVD), information of numbers of frame flags, and/or information of video size, position, and various parameters for video transformation and/or video processing. In some embodiments, in order to transfer the control signals CN, the transmission interfaces 111 and 122 are implemented with I$^2$C (Inter-Integrated Circuit) or another suitable protocol.

In addition, in some embodiments, the processing chip 120 includes registers (not shown). The registers are configured to set configurations of the processing chip 120 and/or parameters related to video/image processing performed by the processing chip 120. In some embodiments, the control signals CN indicate data values, address values, and index values of the registers. The types of the control signals CN are given for illustrative purposes, and the present disclosure is not limited thereto.

In some embodiments, OSD information, which includes at least one blending factor, is transferred between the main chip 110 and the processing chip 120 if an OSD image is expected to be processed. In some embodiments, the at least one blending factor includes alpha parameter, but the present disclosure is not limited thereto.

The number of the main chip 110 and the processing chip 120 and that of the transmission interfaces 111 and 122 in FIG. 1A are given for illustrative purposes, and the present disclosure is not limited thereto. In some embodiments, two or more transmission interfaces 111 are employed in the main chip 110, in which the main chip 110 may transmit/receive various information from/to the processing chip 120 via different transmission interfaces 111 respectively. Similarly, in some embodiments, two or more transmission interfaces 122 are employed in the processing chip 120, in which the processing chip 120 transmits/receives various information from/to the main chip 110 via different transmission interfaces 122 respectively. In some embodiments, two or more processing chips 120 are employed to enhance the video processing.

Figure 1B:
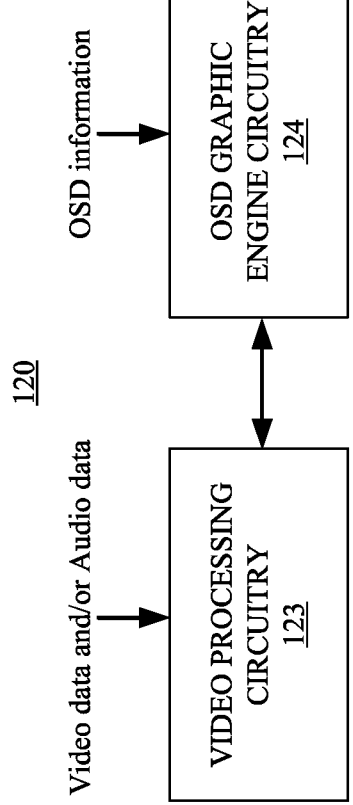
FIG. 1B is a circuit diagram of the processing chip in FIG. 1A, according to some embodiments of the present disclosure.

Reference is made to both FIG. 1A and FIG. 1B. FIG. 1B is a circuit diagram of the processing chip 120 in FIG. 1A, according to some embodiments of the present disclosure. In some embodiments, each of the main chip 110 and the processing chip 120 is implemented with application-specific integrated circuit(s). As an example of FIG. 1B, a main portion of the processing chip 120 may include a video processing circuitry 123 and an OSD graphic engine circuitry 124, which are for performing various operations discussed in various embodiments. The video processing circuitry 123 is coupled to the interfaces 121-122 to receive video data to perform the video/audio processing discussed in various embodiments. In some embodiments, the video processing circuitry 123 includes a video (and audio) codec (i.e., encoder and decoder) circuit, a graphic engine circuit, a de-interlacing processing circuit, an analog-to-digital converter, a digital-to-analog converter, etc. The OSD graphic engine circuitry 124 performs the OSD rendering/mixing/blending operation(s) based on the OSD information, in order to mix OSD graphic data carried on the OSD information with the video (e.g., video SV1 or SV2). In some embodiments, the processing chip 120 includes an audio processing circuitry (not shown) independent from the video processing circuitry 123, in which the audio processing circuitry includes an audio codec (i.e., encoder and decoder) circuit for processing audio data AD2.

The implementations, operations, and/or functions of the processing chip 120 are given for illustrative purposes, and the present disclosure is not limited thereto.

Figure 2:
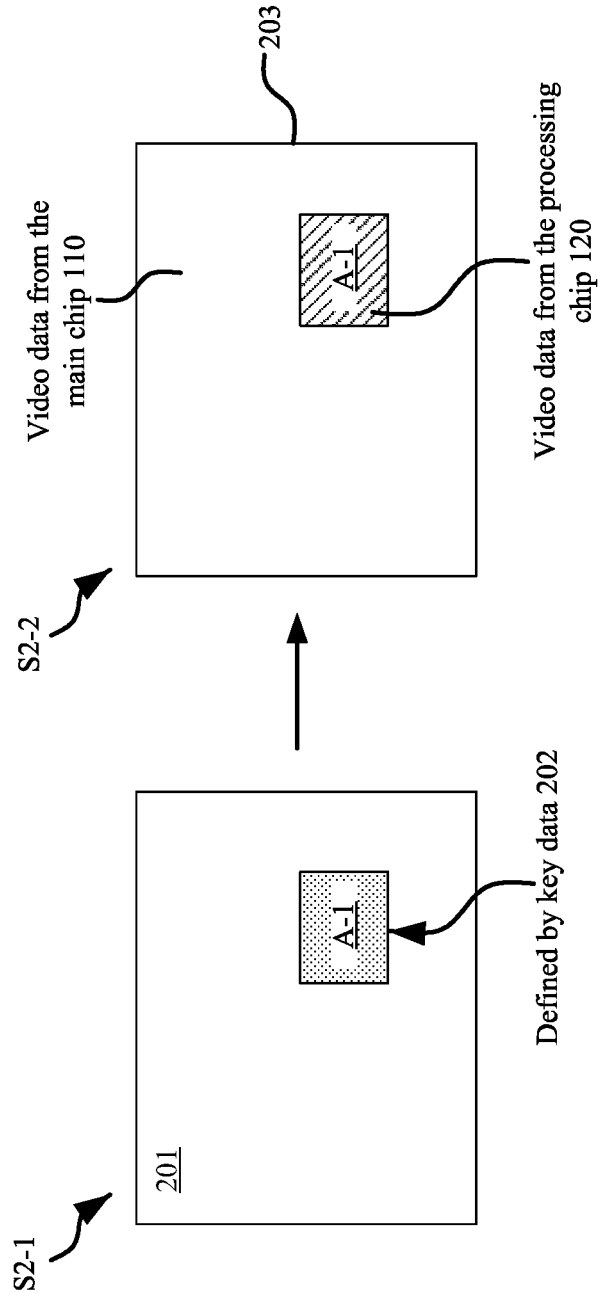
FIG. 2 is a schematic diagram illustrating a process of mixing video sent from the main chip in FIG. 1A with video from the processing chip, according to some embodiments of the present disclosure.

Reference is made to both FIG. 1A and FIG. 2. FIG. 2 is a schematic diagram illustrating a process of mixing video sent from the main chip 110 in FIG. 1A with video from the processing chip 120, according to some embodiments of the present disclosure.

In operation S2-1, video data associated with the data D1 is transmitted from the main chip 110 to the processing chip 120. In examples of FIG. 2, a whole screen video data 201 and key data 202 are carried on the video data associated with the data D1 in FIG. 1A. In some embodiments, the whole screen video data 201 comprises video SV1 and/or OSD/UI graphics expected to be displayed in the whole screen area of the display panel 100A in FIG. 1A. In some embodiments, the key data 202 is for defining an area A-1 in the display panel 100A in FIG. 1A. In some embodiments, the key data 202 may be implemented with a specific code. In some embodiments, the key data 202 may be a specific set of data values (e.g., pixel values, RGB values, pixel indices, or combination thereof). The implementations of the key data 202 are given for illustrative purposes, and the present disclosure is not limited thereto.

In operation S2-2, the processing chip 120 performs video processing based on the whole screen video data 201, the key data 202, and video data processed by the processing chip 120, in order to drive the display panel 100A to show mixed video data 203. In some embodiments, the area A-1 indicates an area on the display panel 100A for displaying video data processed by the processing chip 120. The processing chip 120 may identify the specific code of the key data 202 to acquire the area A-1, and then perform the video processing to make the area A-1 on the display panel 100A blended with the video data processed by the processing chip 120. In some embodiments, video data processed by the processing chip 120 may include video SV2 (or images) carried on the data D2 or the compression video data CVD from the main chip 110. In some embodiments, the area A-1 has a size smaller than the whole area of the display panel 100A. Under this condition, the processing chip 120 scales down graphic/video carried on the data D2 to match the size of the area A-1.

With operations S2-1 and S2-2, the video data processed by the processing chip 120 are overlapped with the video data from the main chip 110. In a non-limiting example, the processing chip 120 displays video on the area A-1 and displays user interface (UI) (e.g., control bar, volume adjustment bar, information bar, etc.) on the remaining area of the display panel 100A.

In various embodiments, the video data mentioned above may be graphic data.

Figure 3:
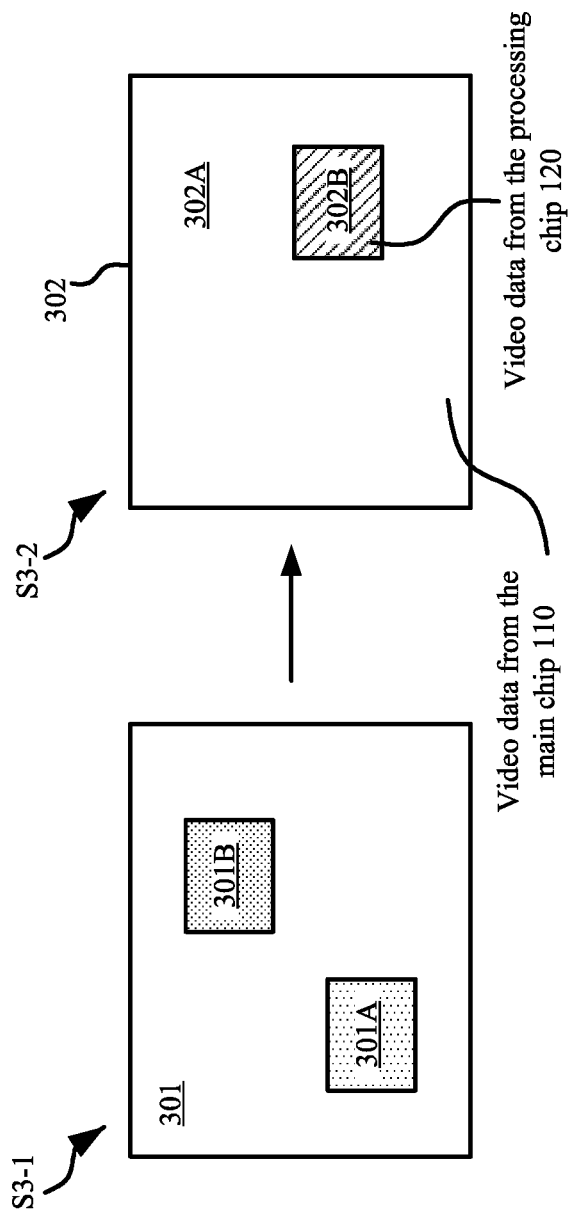
FIG. 3 is a schematic diagram illustrating a process of mixing graphic data sent from the main chip in FIG. 1A with video from the processing chip, according to some embodiments of the present disclosure.

FIG. 3 is a schematic diagram illustrating a process of mixing video data sent from the main chip 110 in FIG. 1A with video from the processing chip 120, according to some embodiments of the present disclosure.

In some embodiments, a technique of "space share" is employed to transmit the video data (e.g., video/OSD/UI) with at least one blending factor from the main chip 110 to the processing chip 120. In operation S3-1, the main chip 110 transmits a whole screen video data 301, which includes video data 301A and at least one blending factor 301B, to the processing chip 120. In the examples of FIG. 3, the at least one blending factor 301B is packed in the whole screen video data 301. Equivalently, the at least one blending factor 301B is transmitted by sharing the space of the whole screen video data 301.

In some embodiments, the at least one blending factor 301B is transmitted along with pixel data (e.g., pixel data values of the video data 301A) carried on the whole screen video data 301 at the same time. In some embodiments, the transmission interface 111 in FIG. 1A is implemented with 4-Byte mode or 5-Byte mode of V-by-One interface to transmit the pixel data with the at least one blending factor 301B. The number of the at least one blending factor 301B in FIG. 3 is for illustrative purposes, and the present disclosure is not limited thereto.

In operation S3-2, the processing chip 120 performs video processing based on the whole screen video data 301 and the data D2 to mix the video from the main chip 110 with video data from the processing chip 120 (e.g., the video SV2 in FIG. 1A), in order to generate mixed video data 302. In some embodiments, as shown in FIG. 3, the mixed video data 302 has areas 302A and 302B, in which the area 302A is for displaying graphic/video carried on the whole screen video data 301, and, in the area 302B, the graphic/video (e.g., video data 301A) carried on the whole screen video data 301, is alpha blended with the video SV2 based on at least one blending factor 301B.

Figure 4:
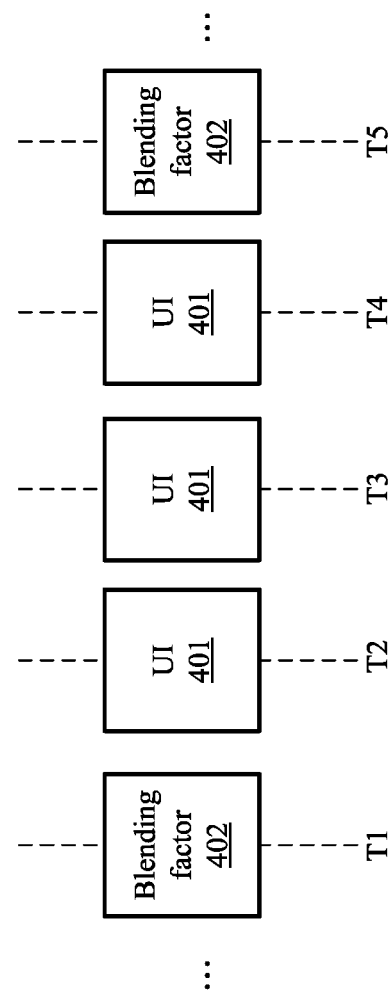
FIG. 4 is a schematic diagram illustrating a process of transmitting graphic data with at least blending factor from the main chip to the processing chip in FIG. 1A, according to some embodiments of the present disclosure.

In other embodiments, the area 302A is for displaying a part of video data 301A (e.g., video/OSD/UI), and, in the area 302B, the other part of the video data 301A alpha blended with the video SV2 based on at least one blending factor 301B is displayed. FIG. 4 is a schematic diagram illustrating a process of transmitting graphic data with at least blending factor from the main chip 110 to the processing chip 120 in FIG. 1A, according to some embodiments of the present disclosure.

In some embodiments, a technique of "time share" (or "time stamp") is employed to transmit video data with at least one blending factor from the main chip 110 to the processing chip 120. As examples shown in FIG. 4, the main chip 110 alternately transmits whole screen video data 401, which includes graphic data (e.g., UI data in FIG. 4), and at least one blending factor 402 to the processing chip 120. In greater detail, two blending factors 402 are transmitted at time intervals T1 and T5 while three whole screen video data 401 (e.g., UI data) are transmitted at time intervals T2-T4. Compared with embodiments of FIG. 3, in the embodiments of FIG. 4, the at least one blending factor and the whole screen video data are transmitted at different time intervals.

In some alternative embodiments, the above techniques of "space share" and "time share" are both employed. For example, the video data are transmitted at time interval Tm, and packed data of at least one blending factor and OSD/UI are transmitted at time interval Tn, in which Tm is different from Tn.

Figure 5B:
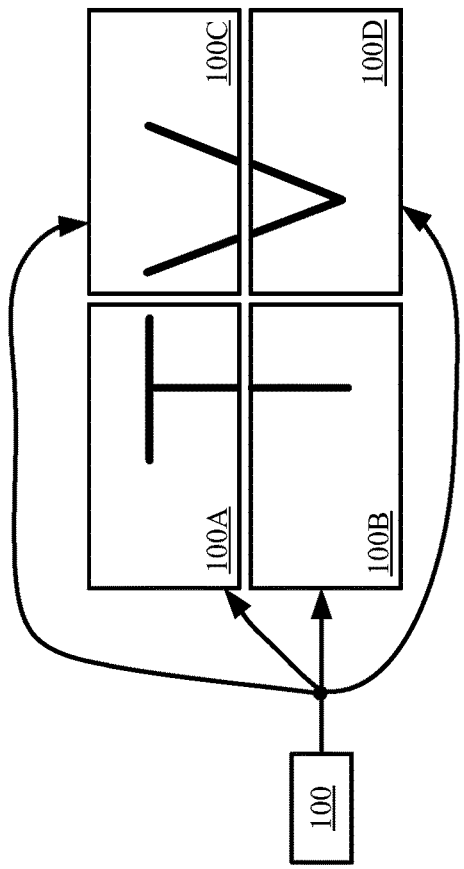
FIG. 5B is a schematic diagram illustrating a TV wall application according to some embodiments of the present disclosure.
Figure 5A:
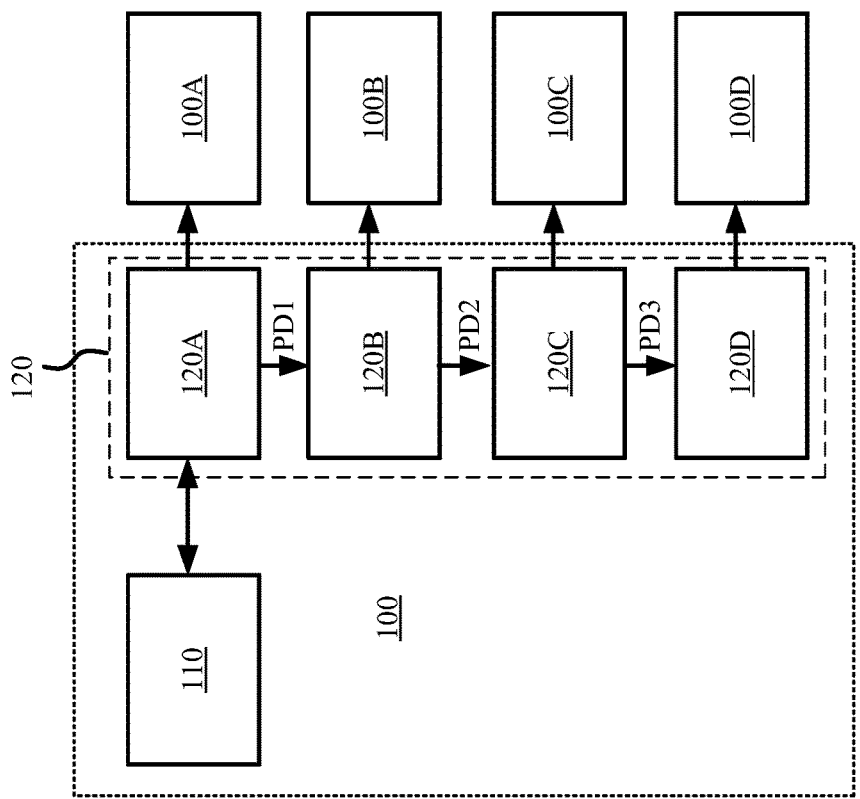
FIG. 5A is a schematic diagram of the video processing system in FIG. 1A with more processing chips according to some embodiments of the present disclosure.

FIG. 5A is a schematic diagram of the video processing system 100 in FIG. 1A with more processing chips 120 according to some embodiments of the present disclosure. FIG. 5B is a schematic diagram illustrating a TV wall application according to some embodiments of the present disclosure.

In some embodiments, if the video processing system 100 in FIG. 1A includes at least two processing chips 120, the video processing system 100 is able to be applied to panels arranged in a manner of TV wall (which are referred to as a daisy-chain). For example, as shown in FIG. 5A, four processing chips 120A-120D are employed. The processing chips 120A-120D are coupled to four display panels 100A-100D respectively. In some embodiments, the four display panels 100A-100D are arranged to build a TV wall, as shown in FIG. 5B.

In embodiments shown in FIG. 5A, the processing chip 120A drives the display panel 100A to display a portion of video and outputs processed data PD1 to the processing chip 120B. The processing chip 120B performs video/audio processing based on the processed data PD1, in order to drive the display panel 100B to display a portion of video and outputs processed data PD2 to the processing chip 120C. With this analogy, the processing chips 120C-120D are able to drive the display panels 100C-100D respectively. As a result, the video can be displayed in a TV-wall formed with the display panels 100A-100D as shown in FIG. 5B.

In some embodiments, the video processing system 100 can be applied to TV, Set-top box (STB), and/or monitors. In some embodiments where the video processing system 100 is applied to the STB, the processing chip 120 is coupled to another input interface (e.g., 4 sets of HDMI Tx), in order to output the processed data to the another input interface.

As described above, with the processing chip in at least one embodiments, the video processing system is able to process video data having the resolution of 8K UHD or any successor of 8K definition in standard.

Various functional components or blocks of the video processing system 100 have been described herein. As will be appreciated by persons skilled in the art, in some embodiments, the functional blocks may be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A video processing system, configured to receive first data having a first video, wherein the video processing system comprises:
    a main chip; and
    a processing chip coupled to the main chip,
    wherein if the main chip cannot process the first video carried on the first data, the processing chip performs a video processing on the first video carried on the first data, in order to drive a display panel, wherein the display panel comprises a first area and a second area, the first area is configured to display a first part of first video data of the first data, and the second area is configured to display a second part of first video data blended with a second video,
    wherein the first video carried on the first data has a first resolution, and the first resolution is at least 8K ultra high definition.

2. The video processing system of claim 1, wherein the main chip is configured to receive the first data, and transmit the first video carried on the first data to the processing chip, and the processing chip is configured to perform the video processing on the first video.

3. The video processing system of claim 2, wherein the main chip is configured to transmit the first video carried on the first data as a compression video data or a video stream to the processing chip, and the processing chip is configured to perform the video processing on the compression video data or the video stream.

4. The video processing system of claim 2, wherein the main chip comprises a first transmission interface, the processing chip comprises a second transmission interface, the main chip is configured to transmit the first data and at least one control signal associated with the first video to the processing chip via the first transmission interface and the second transmission interface, and the processing chip performs the video processing based on the at least one control signal.

5. The video processing system of claim 4, wherein the main chip is further configured to transmit on-screen display information to the processing chip via the first transmission interface and the second transmission interface.

6. The video processing system of claim 1, wherein the processing chip is configured to receive the first data, and perform the video processing on the first video.

7. The video processing system of claim 1, wherein the main chip is configured to receive the first data, the processing chip is configured to receive a second data, wherein the main chip comprises a first transmission interface, the processing chip comprises a second transmission interface, the main chip is configured to transmit the first data and at least one blending factor to the processing chip via the first transmission interface and the second transmission interface, and the processing chip is configured to perform the video processing based on the first data, the at least one blending factor, and the second data, in order to generate a mixed video data to drive the display panel.

8. The video processing system of claim 1, wherein the processing chip is configured to receive the first data, the main chip is configured to receive a second data, wherein the main chip comprises a first transmission interface, the processing chip comprises a second transmission interface, the main chip is configured to transmit the second data and at least one blending factor to the processing chip via the first transmission interface and the second transmission interface, and the processing chip is configured to perform the video processing based on the first data, the at least one blending factor, and the second data, in order to generate a mixed video data to drive the display panel.

9. A processing chip, comprising:
a first transmission interface coupled to a main chip; and
a video processing circuitry coupled to the first transmission interface,
wherein if the main chip cannot process a first video carried on first data, the video processing circuitry receives the first data via the first transmission interface and performs a video processing on the first video, in order to drive a display panel, wherein the display panel comprises a first area and a second area, the first area is configured to display a first part of first video data of the first data, and the second area is configured to display a second part of first video data blended with a second video,
wherein a maximum of a resolution range of the first video is at least 8K ultra high definition.

10. The processing chip of claim 9, wherein the first data is received by the main chip, and the video processing circuitry is configured to receive the first video carried on the first data from the main chip, and the video processing circuitry is configured to perform the video processing on the first video.

11. The processing chip of claim 10, wherein the first video carried on the first data is transmitted as a compression video data or a video stream to the video processing circuitry, and the video processing circuitry is configured to perform the video processing on the compression video data or the video stream.

12. The processing chip of claim 10, wherein the main chip comprises a second transmission interface, the video processing circuitry is configured to receive the first data and at least one control signal associated with the first video from the main chip via the first transmission interface and the second transmission interface, and the video processing circuitry performs the video processing based on the at least one control signal.

13. The processing chip of claim 12, wherein the processing chip is further configured to receive on-screen display information from the main chip via the first transmission interface and the second transmission interface.

14. The processing chip of claim 9, wherein the video processing circuitry is configured to receive the first data, and perform the video processing on the first video.

15. The processing chip of claim 9, wherein the first data is received by the main chip, and the video processing circuitry is configured to receive a second data, wherein the main chip comprises a second transmission interface, the video processing circuitry is configured to receive the first data and at least one blending factor from the main chip via the first transmission interface and the second transmission interface, and the video processing circuitry is configured to perform the video processing based on the first data, the at least one blending factor, and the second data, in order to generate a mixed video data to drive the display panel.

16. The processing chip of claim 9, wherein the video processing circuitry is configured to receive the first data, and a second data is received by the main chip, wherein the main chip comprises a second transmission interface, the processing circuitry is configured to receive the second data and at least one blending factor from the main chip via the first transmission interface and the second transmission interface, and the video processing circuitry is configured to perform the video processing based on the first data, the at least one blending factor, and the second data, in order to generate a mixed video data to drive the display panel.

* * * * *